Aug. 10, 1943.   T. L. FAWICK   2,326,450
FLEXIBLE SHAFT CONNECTION
Filed April 25, 1941
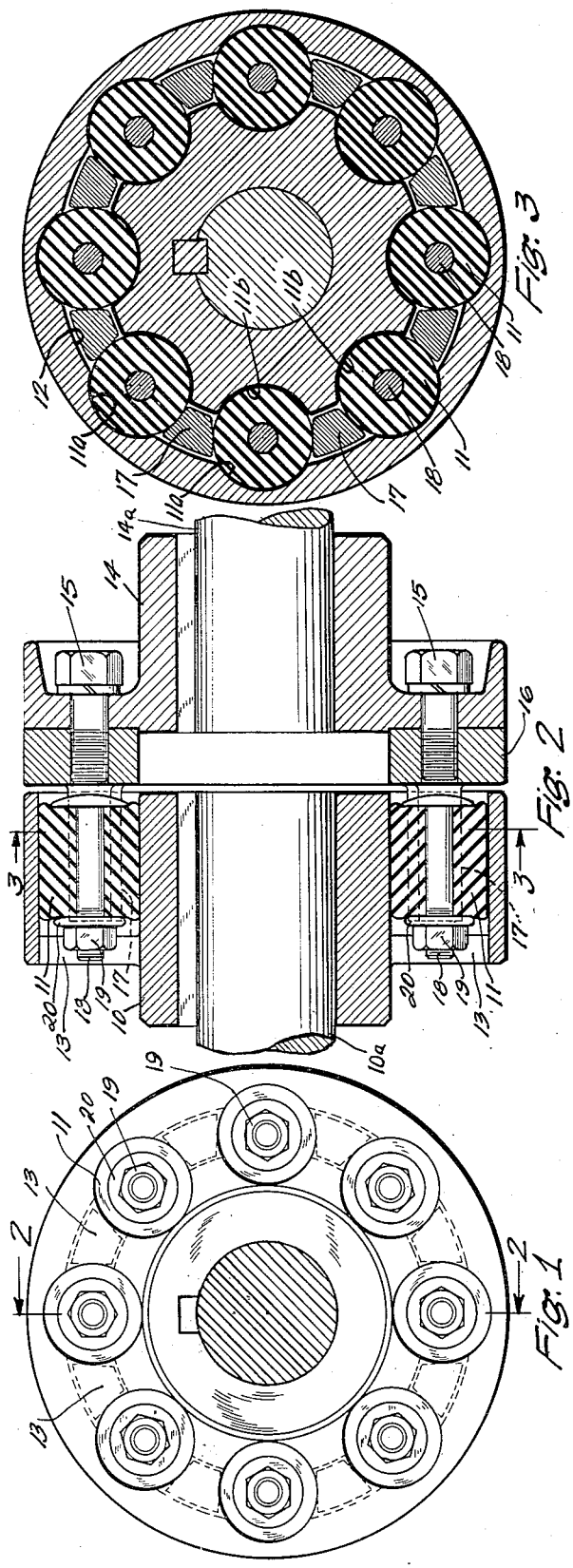
INVENTOR.
Thomas L. Fawick
BY
Willard D. Eakin
Attorney Patented Aug. 10, 1943

2,326,450

UNITED STATES PATENT OFFICE 2,326,450

FLEXIBLE SHAFT CONNECTION

Thomas L. Fawick, Akron, Ohio

Application April 25, 1941, Serial No. 390,277

3 Claims. (Cl. 64—14)

This invention relates to flexible couplings and its chief objects are simplicity and economy of construction; convenient provision for cushioning of the torque and for varying the modulus of torque-cushioning, as for adapting the coupling for different torque loads or for avoiding harmonic vibration; to provide a coupling adapted to operate at high speed without harmful effects resulting from centrifugal force; and to provide some or all of these advantages in a coupling adapted to sustain and cushion axial thrust, as in marine service, for example.

Of the accompanying drawing:

Fig. 1 is an elevation, from the left of Fig. 2, of a coupling embodying my invention in a preferred form for compensating a relatively high degree of shaft misalignment without being required to sustain thrust.

Fig. 2 is a section on line 2—2 of Fig. 1.

Fig. 3 is a section on line 3—3 of Fig. 2.

Referring first to Figs. 1 to 3, the embodiment there shown comprises a hub member 10 mounted upon a shaft 10a and formed with a circumferential series of cylindrical holes parallel with the axis of rotation, for reception of respective cylindrical blocks of rubber 11, 11. Each of the holes is connected with the next by an arcuate recess 12 extending from one face of the member 10 to a web portion 13 of the hub member, the web portions 13 providing connection between the shaft engaging portion and the outer peripheral portion of the hub member 10.

This embodiment also comprises a second hub or shaft-head member 14 mounted upon a shaft 14a and having secured to it by bolts 15, 15 a ring 16 formed with a circumferential series of fingers 17, 17 which extend between the rubber blocks 11 for transmission of torque to or from the latter.

Each of the rubber blocks has extending through it endwise and full-floating in it a bolt 18 provided with a nut 19 and washer 20, the construction being such that tightening of the nut shortens the rubber block and thus causes it to expand radially and press against the torque-transmitting fingers 17 and against the arcuate walls 11$^a$, 11$^a$ and 11$^b$, 11$^b$ of the holes in which they are mounted, with greater or less force according to how far the nuts are set up. Thus the torque-cushioning and vibration damping characteristics of the assembly can be varied, the rubber members being pre-loaded with relation to the transmission of torque, and deformability of the rubber compensates for shaft misalignment. The construction is such that the nuts 19 are readily accessible for the tightening operation, so that the characteristics of the coupling can be easily varied after it has been installed.

An advantage of the coupling shown in Figs. 1 to 3 is that, upon removal of the bolts 15, the assembly comprising the hub 10, cushion members 11 and fingered member 16 can be lifted away, transversely, from the hub member 14, as for repair of a motor or other mechanism on which the hub member 10 is mounted, without interfering with the adjusted, pre-loaded condition of the cushion members.

Another advantage is that the cushion members can be preliminarily assembled with, and moderately tightened in the sockets of, the member 10, and the member 16 then brought into place with its fingers 17 alternating with the cushion members 11, and the nuts 19 thereafter set up to provide the proper preloading of the cushion members, either before or after the member 16 is bolted to the hub member 14.

In this embodiment the nuts are readily accessible, after installation, for changing the modulus of the rubber blocks and some or all of the advantages set out in the above statements of objects are provided, including especially the cushioned sustension of thrust.

I claim:

1. A flexible-coupling assembly comprising a driving shaft and a driven shaft in series and, for connecting them, a pair of coupling members mounted upon them respectively, one of said members being formed with a circumferential series of axially disposed apertures and, on its axially outer face, with spaces connecting the apertures, the other of said coupling members being formed with axially projecting fingers extending into said spaces, axially through-apertured cushion members mounted in the said apertures respectively, and clamping means extending axially through and engaging only the cushion members for holding them distored into strong engagement against the walls of their apertures and against the said fingers.

2. A flexible-coupling assembly comprising a driving shaft and a driven shaft in series and, for connecting them, a pair of coupling members mounted upon them respectively, one of said members being formed with a circumferential series of axially disposed apertures and, on its axially outer face, with spaces connecting the apertures, the other of said coupling members being formed with axially projecting fingers extending into said spaces, axially through-apertured cushion members mounted in the said apertures respectively, and clamping means extending axially through and engaging only the cushion members for holding them distorted into strong engagement against the walls of their apertures and against the said fingers, the proportions being such that the cushion members are held in position by such engagement and substantially without axial interlock.

3. A flexible-coupling assembly comprising a driving shaft and a driven shaft in series and, for connecting them, a pair of coupling members constrained to rotate with them respectively, one of said members being formed with a circumferential series of axially disposed apertures and, on its axially outer face, with spaces connecting the apertures, the other of said coupling members being formed with axially projecting fingers extending into said spaces, axially through-apertured cushion members mounted in the said apertures respectively, and clamping means extending axially through and engaging only the cushion members for holding them distorted into strong engagement against the walls of their apertures and against the said fingers, the coupling member having the projecting fingers being formed with a circumferential series of axially disposed threaded bores for quick detachment from a shaft-head.

THOMAS L. FAWICK.